US011952085B2

(12) United States Patent
Hamilton

(10) Patent No.: US 11,952,085 B2
(45) Date of Patent: *Apr. 9, 2024

(54) HOUSEBOAT ASSEMBLY

(71) Applicant: Harbor Cottage, LLC, Nancy, KY (US)

(72) Inventor: James Desales Hamilton, Nancy, KY (US)

(73) Assignee: Harbor Cottage, LLC, Nancy, KY (US)

( * ) Notice: Subject to any disclaimer, the term of this patent is extended or adjusted under 35 U.S.C. 154(b) by 801 days.

This patent is subject to a terminal disclaimer.

(21) Appl. No.: 16/924,485

(22) Filed: Jul. 9, 2020

(65) Prior Publication Data

US 2020/0398948 A1 Dec. 24, 2020

Related U.S. Application Data

(63) Continuation of application No. 15/637,508, filed on Jun. 29, 2017, now Pat. No. 10,745,090.

(Continued)

(51) Int. Cl.
*B63B 35/44* (2006.01)
*B63B 73/20* (2020.01)
(Continued)

(52) U.S. Cl.
CPC .............. *B63B 35/44* (2013.01); *B63B 73/20* (2020.01); *B63H 20/08* (2013.01);
(Continued)

(58) Field of Classification Search
CPC .... B63B 3/02; B63B 3/04; B63B 3/06; B63B 3/08; B63B 3/142; B63B 3/48;
(Continued)

(56) References Cited

U.S. PATENT DOCUMENTS 1,825,613 A 9/1931 Bell
1,886,471 A 11/1932 Chimang
(Continued)

FOREIGN PATENT DOCUMENTS

DE 202010015125 U1 1/2011
EP 1616784 A1 1/2006
(Continued)

OTHER PUBLICATIONS https://web.archive.org/web/20160512092151/http://www.sunstarhouseboats.com/Custom-Houseboat-manufacturing.html.
U.S. Appl. No. 16/901,755, entitled "Houseboat Asssembly," filed Jun. 15, 2020.

*Primary Examiner* — Ajay Vasudeva
(74) *Attorney, Agent, or Firm* — Frost Brown Todd LLP

(57) ABSTRACT

The present disclosure relates to a houseboat assembly formed from a cabin assembly secured to a hull assembly. In some version of the houseboat assembly, one or both of the cabin assembly and the hull assembly may be formed in accordance with a boat type and/or a floor plan. The boat type and/or floor plan may be selected by a customer. The cabin assembly may be formed at a first location and the hull assembly may be formed at a second location. The cabin assembly and hull assembly may then be transported to a third location. At the third location, the cabin assembly may be secured to the hull assembly to form the cabin assembly at the third location. The third location may be requested or specified by the customer.

11 Claims, 12 Drawing Sheets

Related U.S. Application Data

(60) Provisional application No. 62/357,003, filed on Jun. 30, 2016.

(51) Int. Cl.
  *B63H 20/08* (2006.01)
  *G06Q 30/0601* (2023.01)

(52) U.S. Cl.
  CPC ..... *G06Q 30/0621* (2013.01); *G06Q 30/0643* (2013.01); *B63B 2035/4426* (2013.01); *Y02A 30/00* (2018.01)

(58) Field of Classification Search
  CPC ....... B63B 2003/485; B63B 5/04; B63B 5/06; B63B 5/065; B63B 5/08; B63B 5/10; B63B 5/24; B63B 2005/242; B63B 2005/245; B63B 2005/247; B63B 35/34; B63B 35/36; B63B 35/38; B63B 35/44; B63B 2035/4426; B63B 73/00; B63B 73/10; B63B 73/20; B63H 20/08
  See application file for complete search history.

(56) References Cited

U.S. PATENT DOCUMENTS

| | | | |
|---|---|---|---|
| 2,079,635 A * | 5/1937 | Sharp | B63B 3/68 |
| | | | 174/505 |
| 2,291,380 A | 7/1942 | Enfield | |
| 3,648,639 A * | 3/1972 | French | B60P 3/1041 |
| | | | 114/65 R |
| 3,662,412 A | 5/1972 | Hawkins | |
| 3,800,726 A | 4/1974 | Murphy | |
| 4,048,685 A | 9/1977 | Gail | |
| 4,716,847 A * | 1/1988 | Wilson, Jr. | B63B 1/14 |
| | | | 114/61.15 |
| 4,803,944 A | 2/1989 | Roberson | |
| 4,981,100 A | 1/1991 | Bergeron | |
| 5,255,625 A | 10/1993 | Hattori | |
| 5,517,940 A | 5/1996 | Beyer | |
| 5,743,203 A | 4/1998 | NcNamara | |
| 5,775,250 A | 7/1998 | Kobayashi et al. | |
| 6,035,796 A | 3/2000 | Vowels | |
| 6,394,014 B1 | 5/2002 | Waldock | |
| 6,647,913 B2 | 11/2003 | Brignolio | |
| 7,216,603 B2 | 5/2007 | Towley, III et al. | |
| 8,454,399 B1 | 6/2013 | Zelechonok | |
| 9,428,252 B1 | 8/2016 | Brown et al. | |
| 10,304,109 B2 * | 5/2019 | Hamilton | B63H 20/08 |
| 10,723,421 B2 * | 7/2020 | Hamilton | B63H 20/08 |
| 10,745,090 B2 * | 8/2020 | Hamilton | B63B 73/20 |
| 11,535,346 B2 * | 12/2022 | Hamilton | G06Q 30/0621 |
| 2002/0134295 A1 | 9/2002 | Chimato | |
| 2005/0064768 A1 | 3/2005 | Lowe | |
| 2007/0056498 A1 | 3/2007 | Poser | |
| 2008/0011218 A1 | 1/2008 | Smith et al. | |
| 2010/0043693 A1 | 2/2010 | Henricson | |
| 2011/0247538 A1 | 10/2011 | Gimpel et al. | |
| 2012/0130912 A1 | 5/2012 | Marlowe | |
| 2014/0143063 A1 | 5/2014 | Marino | |
| 2019/0259079 A1 | 8/2019 | Hamilton | |

FOREIGN PATENT DOCUMENTS

| | | | | |
|---|---|---|---|---|
| FR | | 2510161 A1 * | 1/1983 | ............ B63B 71/00 |
| FR | | 2510161 A1 | 1/1983 | |
| GB | | 574609 A * | 1/1946 | .......... B63B 35/003 |
| WO | WO 1990/01000 A1 | | 2/1990 | |

* cited by examiner

HOUSEBOAT ASSEMBLY

This application is a continuation of U.S. Ser. No. 15/637,508, entitled "Houseboat Assembly," filed Jun. 29, 2017, now issued as U.S. Pat. No. 10,745,090 on Aug. 18, 2020, which claims priority to U.S. Provisional App. No. 62/357,003, entitled "Houseboat Assembly," filed Jun. 30, 2016, the disclosures of which are hereby incorporated by reference herein in their entirety.

BACKGROUND

When purchasing a conventional houseboat, the purchaser must select a houseboat with a configuration pre-determined by the manufacturer and with no direct input from the purchaser. In some instances, it may be desirable to allow a user to select a particular floorplan for a houseboat cabin assembly from a variety of floorplans, and thereafter connect the selected cabin assembly to a hull to form a houseboat.

Conventional houseboats must be transported over highways and other roadways which require permits and special trucking measures. It may also be desirable to build or manufacture the cabin assembly at a first location, manufacture the hull at a second location, and thereafter assemble the houseboat at a third location. The third location may be proximate the particular body of water where the user desires to use the houseboat. Conventional houseboats are assembled into one structure, and thereafter transported to a body of water and launched. In some instances, it may be desirable to allow the cabin assembly to be lowered onto the hull while the hull is situated on a trailer of a jacking system. The houseboat may thereafter be assembled by securing the cabin assembly to the hull, and forming the houseboat on the trailer. The trailer may then be moved to launch the houseboat into the desired body of water by either backing the trailer into the water or pivoting the trailer to slide the houseboat off and into the water.

Conventional pre-fabricated or pre-manufactured residential houses are not equipped for marine environments because these structures are constructed with residential grade materials. Inasmuch as houseboats encounter marine environments, it may be desirable to manufacture a pre-fabricated residential house using marine grade wiring and electrical components throughout the structure. This structure may then comprise a cabin assembly and allow a user to secure the cabin assembly to a hull to form a houseboat. Marine grade wiring and components provide the houseboat with significantly more resistance to adverse environmental conditions. Residential windows may provide for more cost-effectively manufacturing a houseboat.

Conventional houseboat hull designs are not conducive to receiving a pre-fabricated house thereon. Therefore, in some instances, it may be desirable to provide a peripheral receiving surface on the hull to mate with a similar surface on a pre-fabricated house configured to be used as a cabin assembly. The peripheral receiving surface may be stepped or sloped or have a horizontal step for receiving the cabin assembly combined with an angled step to wick and direct water away from the cabin assembly.

Conventional houseboats provide a flat and solid surface at the uppermost portion of the houseboat. This surface is applied with a chemical gel coat material, which typically requires replacement ever few years because of the intense weather exposure. This chemical gel coat material wears off over time and enters the marine environments where houseboats are typically stored and used, causing ecological damage. Further, this surface can become slippery to a user and may also retain water in divots or puddles formed in the horizontal surface of the decking. Therefore, in some instances, it may be desirable to provide a roof deck having horizontal boards disposed upon cross-members, similar to a residential backyard deck, where the cross-members are secured to the upper surface of the cabin assembly roof instead of posts in the ground. Inasmuch as the cabin assembly roof is peaked and sloped downward, such a configuration would allow rain water or spray to run between the horizontal boards, past the cross-members, and off the cabin assembly roof. The usage of horizontal boards eliminates the need to apply a chemical gel coat material on the uppermost surface of the houseboat. In some instances, composite decking or other residential decking may be used for the boards.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
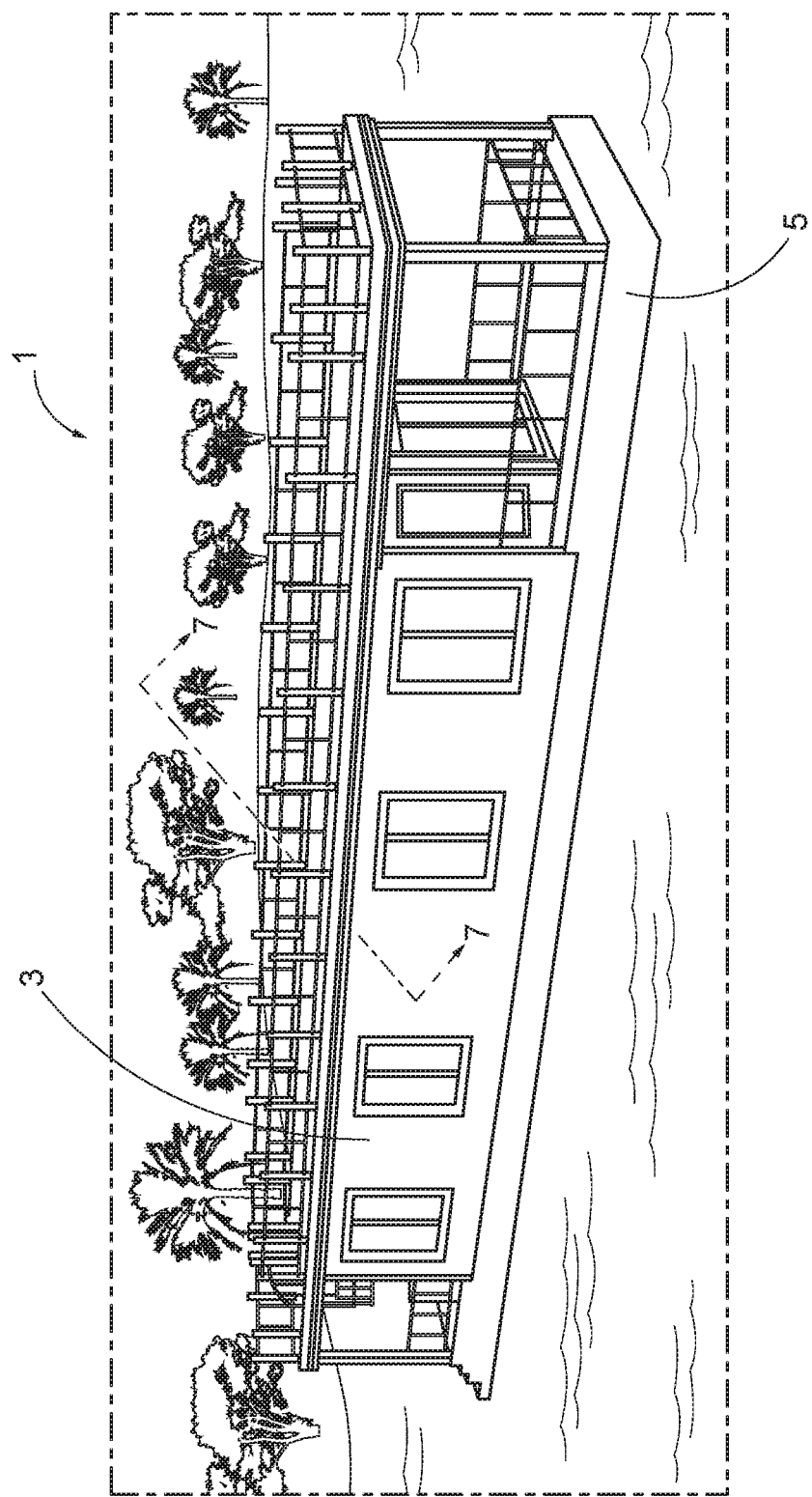
FIG. 1 depicts a perspective view of an exemplary houseboat assembly in a marine environment.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

It will be appreciated that any one or more of the teachings, expressions, versions, examples, etc. described herein may be combined with any one or more of the other teachings, expressions, versions, examples, etc. that are described herein. The following-described teachings, expressions, versions, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

I. Customization

Figure 2:
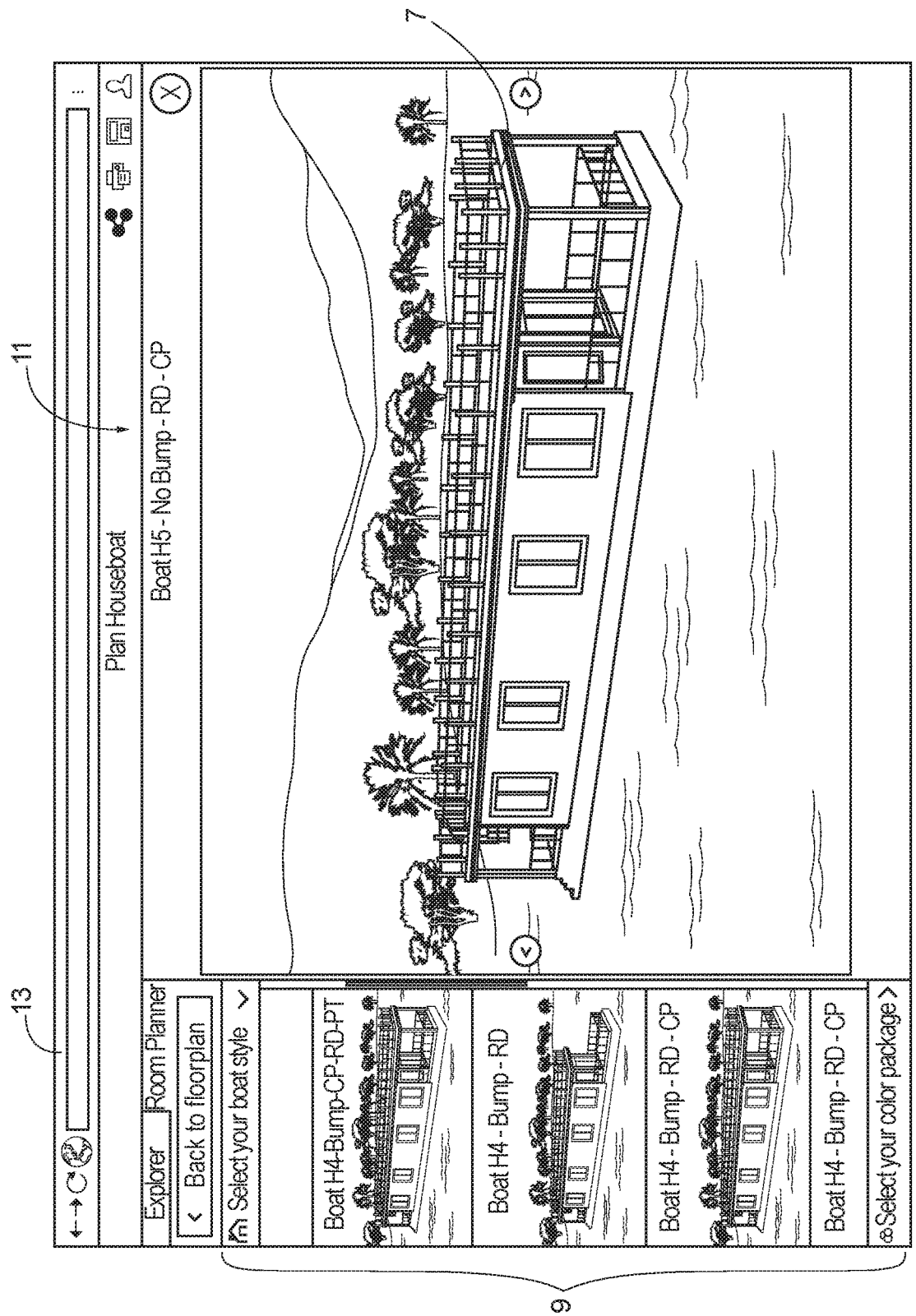
FIG. 2 depicts a diagrammatical view of an exemplary graphical interface for use in selecting from a plurality of exemplary boat styles to facilitate customizing the manufacturing of a houseboat assembly similar to the houseboat assembly of FIG. 1.
Figure 3:
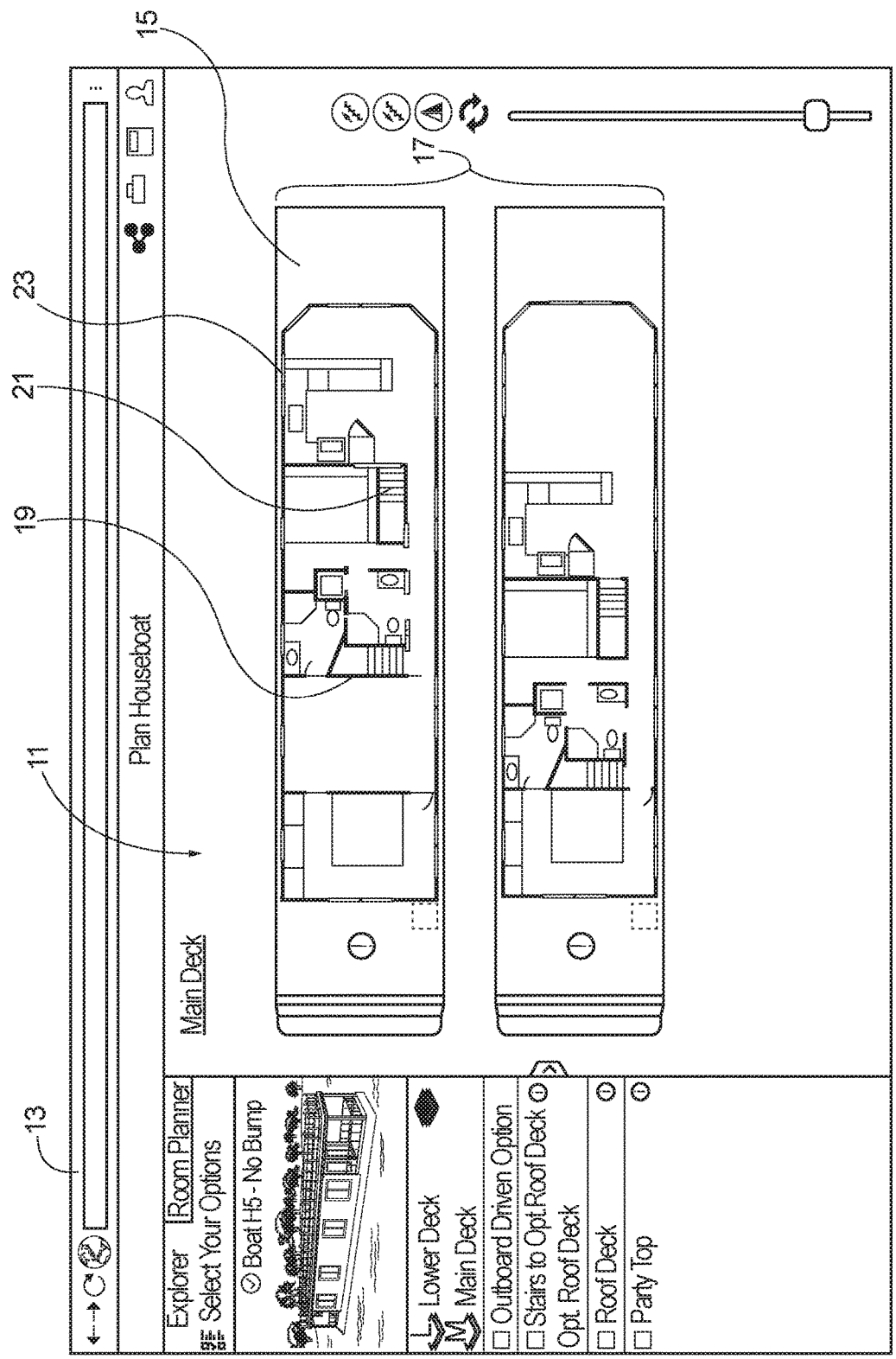
FIG. 3 depicts a diagrammatical view of an exemplary graphical interface for use in selecting from a plurality of exemplary floor plans to facilitate customizing the manufacturing of a houseboat assembly similar to the houseboat assembly of FIG. 1.

As shown in FIGS. 1-5, some versions of an exemplary houseboat assembly (1) include a cabin assembly (3) and a hull assembly (5). One or both of the cabin assembly (3) and hull assembly (5) may be customized by a customer prior to manufacturing. As shown in FIG. 2, the customer may select a particular pairing of cabin assembly (3) and hull assembly (5) by selecting a selected boat style (7) from a plurality of boat styles (9) via a graphical user interface (11) such as those provided through a web browser (13) on a computer (not shown). As shown in FIG. 3, the customer may select a selected floorplan (15) for cabin assembly (3) from a plurality of floorplans (17) via graphical user interface (11) to further customize selected boat style (7). Some versions of graphical user interface (11) provide functionality for further customizing features of selected floorplan (15) such as by adding, moving, or removing a wall (21), a stairway (23), or a window (25).

Selected boat style (7) and/or selected floorplan (15) may be selected by the customer based on personal preference, budget, or other factors specific to the customer. Each of the plurality of boat styles (9) and each of the plurality of floorplans (17) is associated with a particular set of specifications, characteristics, or other features that combine to define cabin assembly (1). Once a customer selects selected boat style (7) and/or selected floorplan (15), cabin assembly (3) and/or hull assembly (5) is manufactured in accordance with the specifications associated with selected boat style (7) and/or selected floorplan (15) and mated or secured to hull assembly (5) to form houseboat assembly (1).

Figure 4:
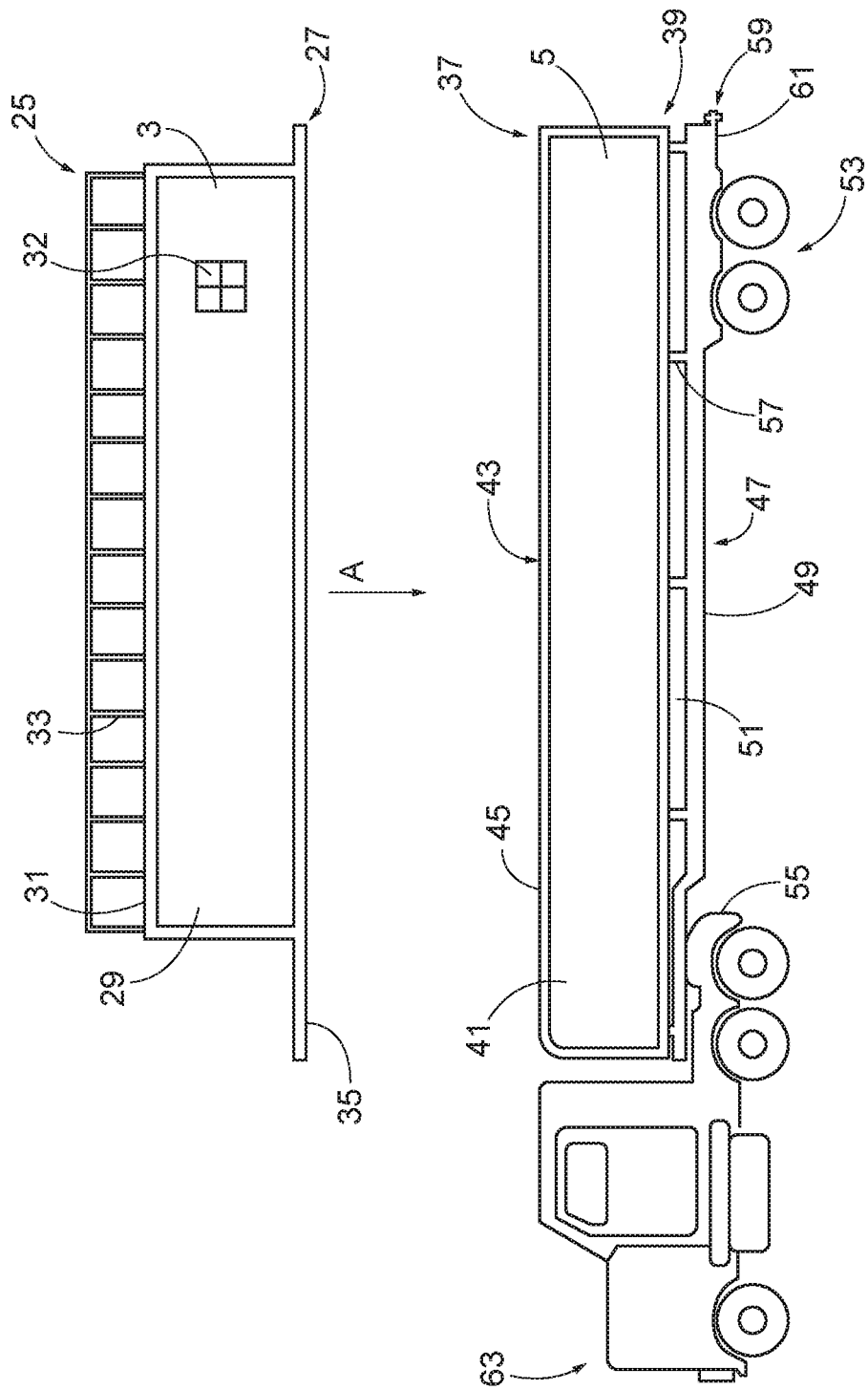
FIG. 4 depicts another exemplary houseboat assembly similar to the houseboat assembly of FIG. 1 and being assembled by disposing an exemplary cabin assembly onto an exemplary hull assembly, whereby the hull assembly is resting on an exemplary trailer.

FIG. 4 depicts houseboat assembly (1) prior to full assembly, whereby cabin assembly (3) is moved in the direction of Arrow (A) and secured to hull assembly (5). Cabin assembly (3) extends from an upper portion (25) to a lower portion (27) and is comprised of a set of generally vertical walls (29) and a roof (31). Cabin assembly (3) may further include other residential features such as one or more windows (32) and a railing assembly (33) extending from roof (31). Cabin assembly (3) further includes a lower surface (35), generally extending around the periphery of lower portion (27). Windows (32) may be residential windows installed on cabin assembly (3) which represents an efficiency of scale and cost-savings when manufacturing cabin assembly (3).

The positioning of walls (19), the overall footprint or size of cabin assembly (3), the placement of windows (32), and the orientation of other similar features are in accordance with selected boat style (7) and/or selected floor plan (15). Once selected boat style (7) and/or selected floor plan (15) is selected, cabin assembly (3) is built or manufactured in accordance with selected boat style (7) and/or selected floor plan (15) and walls (19), roof (31), windows (32), and similar features are all positioned and integrated into cabin assembly (3) in accordance with selected boat style (7) and/or selected floor plan (15).

Figure 6:
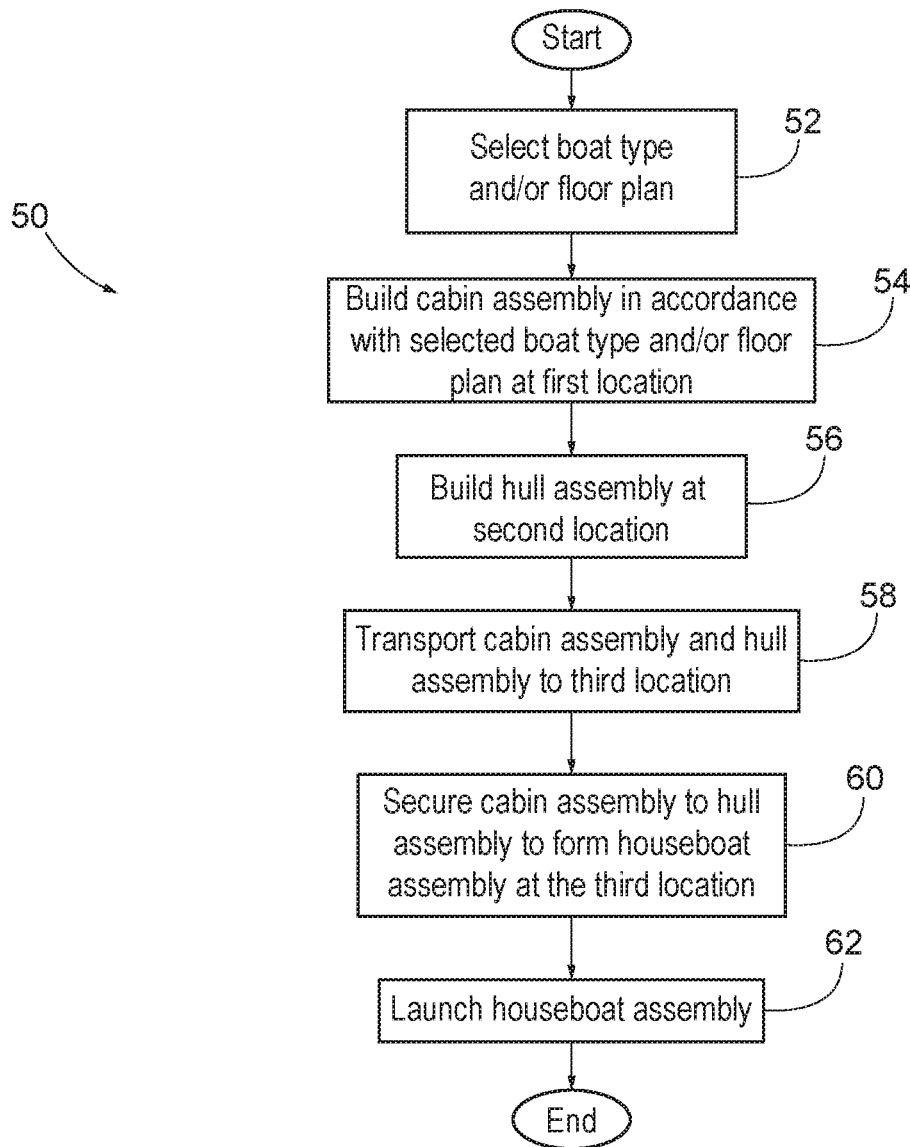
FIG. 6 depicts a flowchart for an exemplary method for forming a houseboat assembly similar to the houseboat assembly of FIG. 1.

As shown in FIG. 4, hull assembly (5) generally extends from an upper portion (37) to a lower portion (39) and is comprised of a set of walls (41) cooperating to define an interior pocket (43), as shown in FIG. 6. The set of walls (41) may cooperate to define the shape of hull assembly (5) and may define a flat, rounded, or v-shaped bottom of the hull assembly (5). Hull assembly (5) includes an upper surface (45), generally extending around the periphery of upper portion (37). Hull assembly (5) may be formed from several pieces of material welded together. For example, plates of aluminum may be welded together to form all or part of hull assembly (5).

Selected boat style (7) and selected floorplan (15) are non-limiting examples of a preference the customer may designate regarding houseboat assembly (1). In some versions of houseboat assembly (1), each boat style in plurality of boat style (9) is associated with an external profile of houseboat assembly (1). In some version of houseboat assembly (1), each floorplan in plurality of floor plans (17) is associated with an internal profile of houseboat assembly (1). Thus, selected boat style (7) may reflect a preference of the customer regarding an exterior area of houseboat assembly (1), while selected floorplan (15) may reflect a preference of the customer regarding an internal area of houseboat assembly (1).

II. Manufacturing

In some embodiments of the disclosure, manufacturing of cabin assembly (3) may be accomplished at various facilities spread across a wide geographical area. As such, the customer or the houseboat manufacturer may choose to manufacture cabin assembly (3) at the closest or nearest manufacturing facility to the customer or to the customer's intended destination for the final assembly of houseboat assembly (1). Manufacturing cabin assembly (3) in the same general geographical area as the customer or the customer's intended destination provides an enormous cost savings and reduction in shipping and transportation costs. In some versions, hull assembly (5) is generally not customized and may be manufactured in a standardized shape. Thus, hull assembly (5) can be prebuilt or pre-manufactured and either sent to the selected manufacturing facility when houseboat assembly (1) is ordered or purchased, or the manufacturing facility may periodically receive stock of new hull assemblies (5) for use in future orders for houseboat assembly (1).

Figure 5:
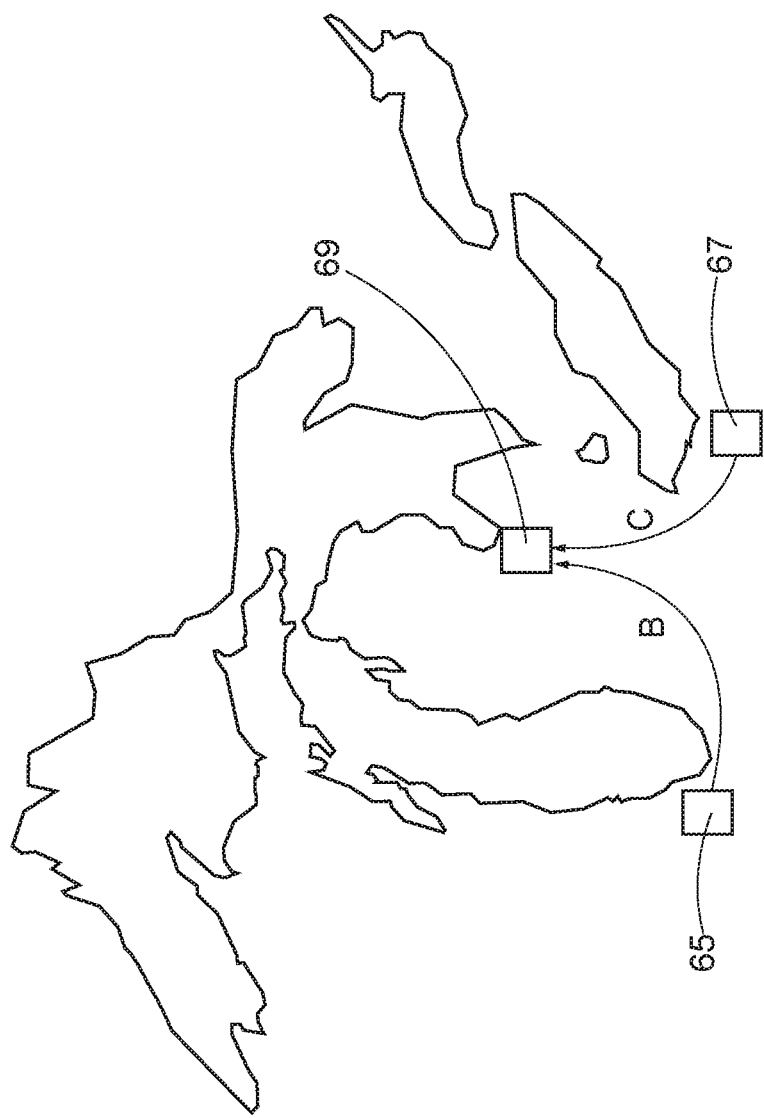
FIG. 5 depicts a diagrammatical view of an exemplary map with locations of manufacturing element of a houseboat assembly similar to the houseboat assembly of FIG. 1.

As shown in FIG. 5, in some versions of houseboat assembly (1), cabin assembly (3) may be manufactured at a first location (65) while hull assembly (5) may be manufactured at a second location (67). Cabin assembly (3) may thereafter be transported from first location (65) to a third location (69), depicted geographically in FIG. 5 as moving in the direction of Arrow (B). Similarly, hull assembly (5) may thereafter be transported from second location (67) to third location (69), depicted geographically in FIG. 5 as moving in the direction of Arrow (C). Once both cabin assembly (3) and hull assembly (5) are at third location (69), cabin assembly (3) may be connected to hull assembly (5) to form houseboat assembly (1) at third location (69). In some versions, third location (69) is generally located where the customer intends to launch houseboat assembly (1) and therefore assembled houseboat assembly (1) may be assembled at the launch area and subsequently launched without having to transport the entire assembled houseboat assembly (1) over major roads such as interstate highways. The customer may designate third location (69) as a preference regarding houseboat assembly (1). This preference may be collected through a graphical user interface similar to graphical user interface (11) and web browser similar to web browser (13)

Some versions of cabin assembly (3) and/or hull assembly (5) may be manufactured in such a width and height to allow cabin assembly (3) and/or hull assembly (5) to travel along major roads such as interstate highways without an "oversized load" permit or other special precautions for transportation. Specifically, some versions of cabin assembly (3) and/or hull assembly (5) are restricted to smaller than 9 feet in width and 14 feet in height once placed upon a trailer. When cabin assembly (3) and hull assembly (5) are manufactured within these tolerances, cabin assembly (3) and/or hull assembly (5) may be transported along major roads without a specialized permit or other precautions.

During or after the assembly and construction of hull assembly (5), hull assembly (5) may be placed onto a specially designed jacking system (47). Jacking system (47) includes a trailer (49) having a hull receiving section (51) configured to receive hull assembly (5) thereon and selectively hold hull assembly (5) during transportation. Trailer (49) may resemble elements of a cargo trailer or boat trailer, having a set of wheels (53), a hitch (55), a set of bracing beams (57), a vehicle light (59), a bumper (61), and similar features of trailers. Trailer (49) is coupled with a tractor (63) or towing engine such as a commercial "semi-tractor" for transporting cargo.

Hull assembly (5) is may be manufactured in situ on hull receiving section (51) of trailer (49) or placed onto hull receiving section (51) of trailer (49) after manufacturing. Trailer (49) and tractor (63) are connected using hitch (55), whereby tractor (63) is operable to transport trailer (49) and therefore hull assembly (5) to any desired geographic location. Once hull assembly (5) is in proximity to cabin assembly (3), cabin assembly (3) is lowered onto hull assembly (5) while hull assembly (5) remains on hull receiving section (51). As such, trailer (49) is configured to support the weight of both hull assembly (5) and cabin assembly (3). After cabin assembly (3) is placed onto hull assembly (5), the two components are connected and secured together to form houseboat assembly (1) in situ on trailer (49).

Once houseboat assembly (1) is assembled on trailer (49), tractor (63) is operable to drive houseboat assembly (1) to a nearby body of water, potentially bypassing any highways or major roads. As will be discussed below, completing the formation of houseboat assembly (1) proximate the desired body of water allows the customer to bypass any highway permits or special requirements necessary to transport a large item such as a houseboat over a highway or major road.

Once tractor (63) transports houseboat assembly (1) to the body of water, jacking system 23 is operable to place houseboat assembly (1) in the body of water, similar to a boat trailer. In some embodiments of jacking system (47), tractor (63) is used to dispose hull receiving portion (51) in the water, backing trailer (49) into the water until the floatation qualities of hull assembly (5) allow houseboat assembly (1) to float up and off of hull receiving section (51). In other embodiments of jacking system (47), the various beams and structural support of hull receiving section (51) raise up, similar to a dump truck, to pivot hull receiving section (51) and houseboat assembly (1) into an angled position and slide houseboat assembly (1) into the water.

As shown in FIG. 6, a method (50) of manufacturing a houseboat assembly such as houseboat assembly (1) begins with a step (52). In step (52), a customer or purchaser of the houseboat assembly selects a particular boat type from a plurality of boat types and/or a floor plan from a plurality of floor plans. Once the user selects the particular floor plan, step (52) moves to a step (54). In step (54), a cabin assembly is constructed or manufactured in accordance with the particular selected boat type and/or selected floor plan at a first location. This first location may be the manufacturing facility of a modular home building factory. Thereafter, step (54) moves to a step (56).

In step (56), a hull assembly is constructed or manufactured at a second location. The second location may be a dry dock or a metal fabrication shop. Step (56) thereafter moves to a step (58). In step (58), both the cabin assembly and the hull assembly are transported to a third location. The third location may be a body of water where the customer is planning on using the houseboat assembly. Inasmuch as the cabin assembly is separate from the hull assembly, each may travel to the third location along a separate route and with a much lower profile than a fully assembled houseboat assembly. Once the cabin assembly and the hull assembly are located at the third location, step (58) moves to a step (60).

In step (60), the cabin assembly is connected to the hull assembly. In some versions of method (50), the hull assembly is disposed on a trailer having a jacking system for holding the hull assembly. In some versions of method (50), the cabin assembly is lowered onto the hull assembly by a crane or via a lift mechanism. In other versions of method (50), the cabin assembly is stationary and the trailer with the hull assembly is moved under the cabin assembly for connecting therewith. Once the cabin assembly is connected with the hull assembly, the cabin assembly is secured thereto and any desired electrical or mechanical connections are made between the two elements. Thereafter, step (60) proceeds to a step (62).

In step (62), the assembled houseboat assembly is launched into the body of water at the third location. In some versions of method (50), this may be accomplished by tilting the trailer and sliding the houseboat assembly into the water. Or alternatively, in other versions of method (50), the trailer is backed into the water via a boat ramp and the houseboat assembly is allowed to slide and float off the trailer and into the water, freeing the houseboat assembly from the trailer and launching the houseboat assembly at the third location. After the houseboat assembly is successfully launched in step (62), method (50) ends.

III. Marine Grade Components

Figure 7:
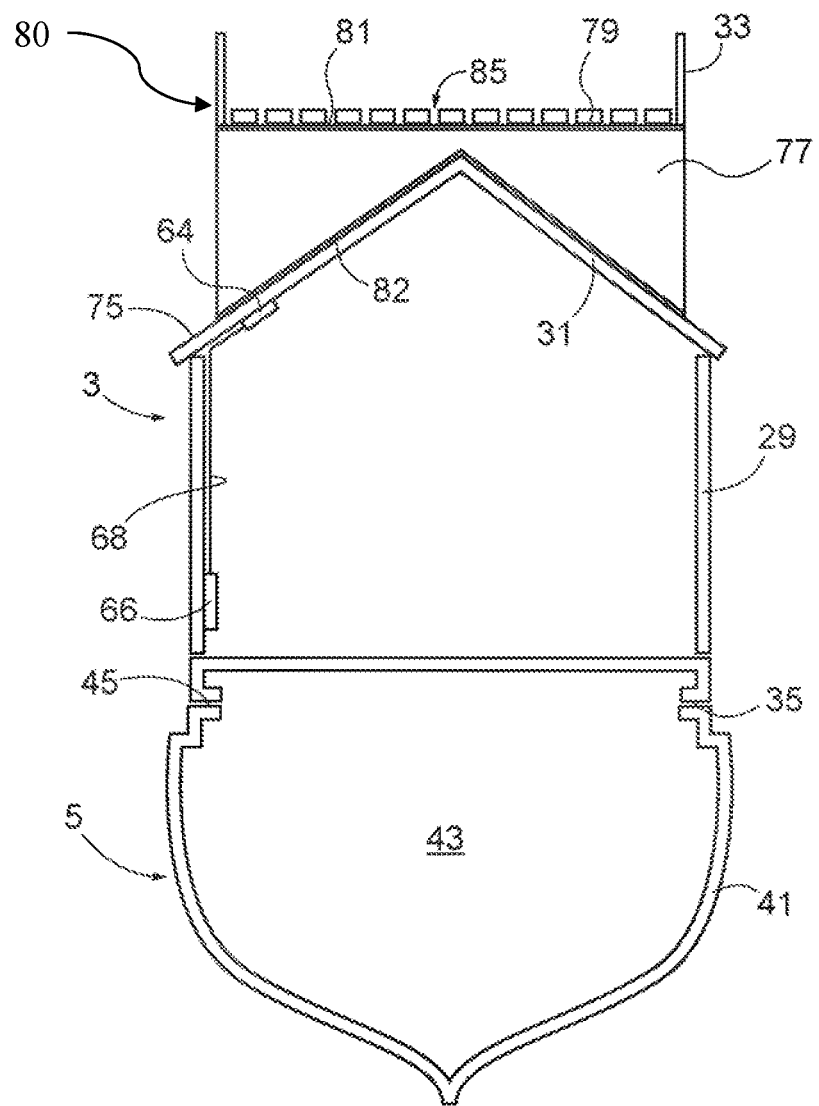
FIG. 7 depicts a cross-sectional view taken along line 7-7 of FIG. 1.

In some embodiments of the present disclosure, each light outlet, electrical connection, and other electrical components are wired into various circuits using marine grade wiring. Marine grade wiring is specifically manufactured to withstand harsh marine or nautical environments and is highly resistant to moisture and degradation. Marine grade wiring is significantly more resistant to adverse conditions than typical home wiring. In addition to marine grade wiring, some embodiments of the present disclosure include marine grade wire connectors, terminals, ties, clamps, and other electrical components or wiring accessories. As shown in FIG. 7, an electrical component (64) is connected to a power supply (66) through a marine grade wire (68).

IV. Runoff Flange

As discussed above, in some embodiments of the present disclosure, the hull is manufactured to provide a generally horizontal receiving surface around at least a portion of the periphery of the hull. In some embodiments, the receiving surface is the upper most surface of the hull. The receiving surface is configured to receiving the lower most surface of the cabin assembly and facilitate the securing of the cabin assembly to the hull. In an exemplary embodiment of a houseboat of the present disclosure, the cabin assembly includes a cabin surface oriented to mate and abut with receiving surface when the cabin assembly is brought into alignment with the hull. A series of clamps or bolts are used to secure the cabin surface to the receiving surface of the hull.

Figure 8:
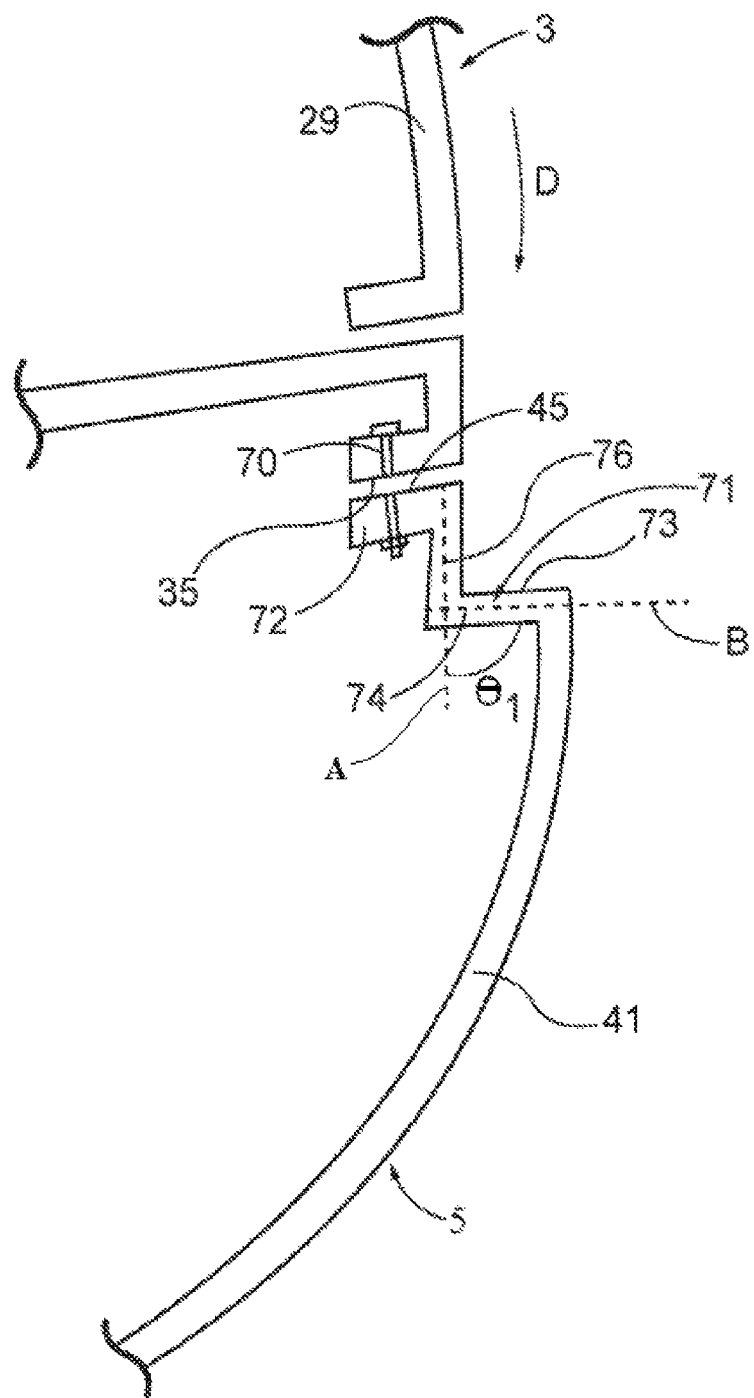
FIG. 8 depicts a cross-sectional view of an exemplary connection between an exemplary cabin assembly and an exemplary hull assembly similar to the cabin assembly and the hull assembly of FIG. 4.
Figure 9:
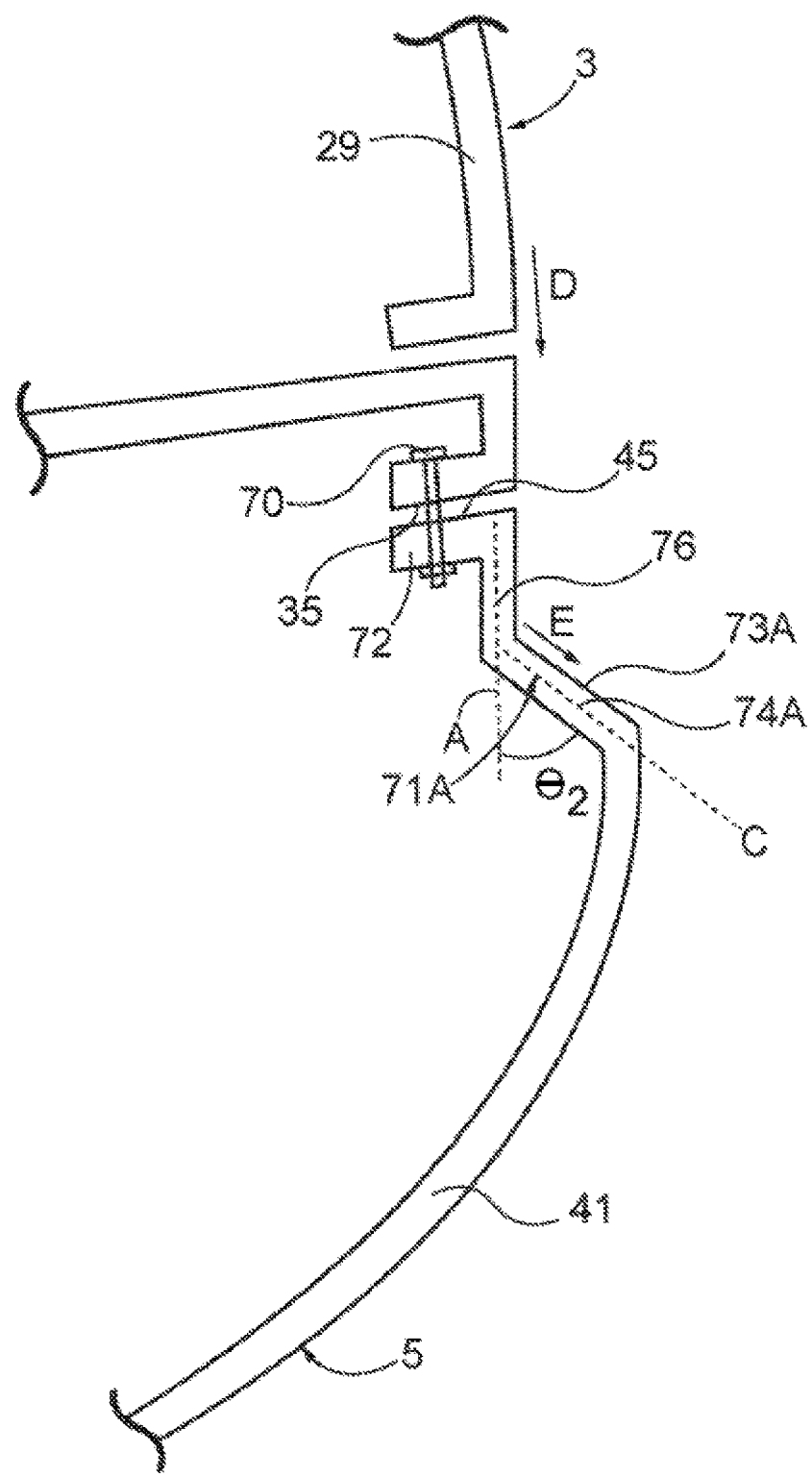
FIG. 9 depicts a cross-sectional view of another exemplary connection between an exemplary cabin assembly and an exemplary hull assembly similar to the cabin assembly and the hull assembly of FIG. 4.
Figure 10:
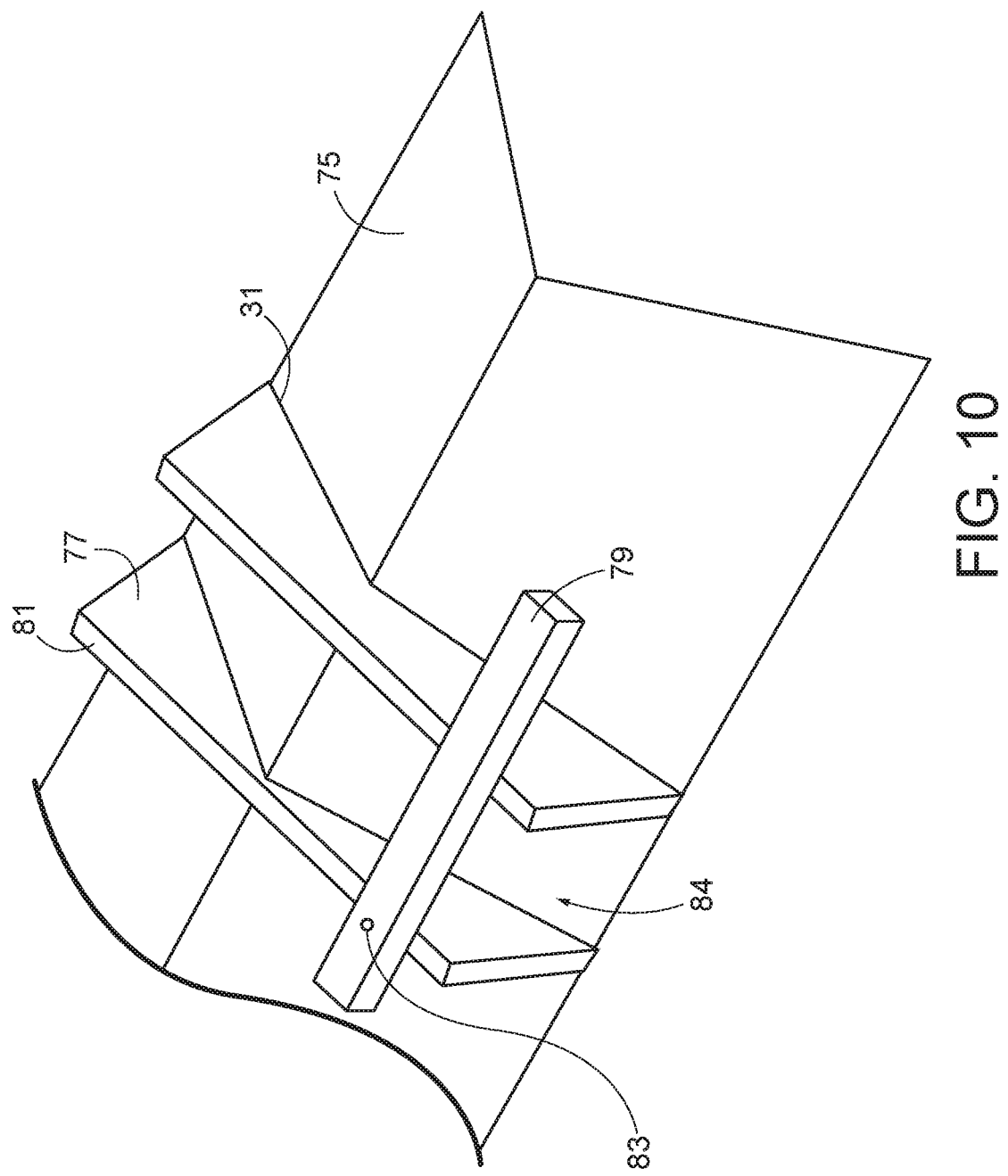
FIG. 10 depicts a perspective view of an exemplary roof area of another exemplary cabin assembly, with parts removed to illustrate the peaked roof having exemplary cross-members and exemplary slats disposed thereon.
Figure 11:
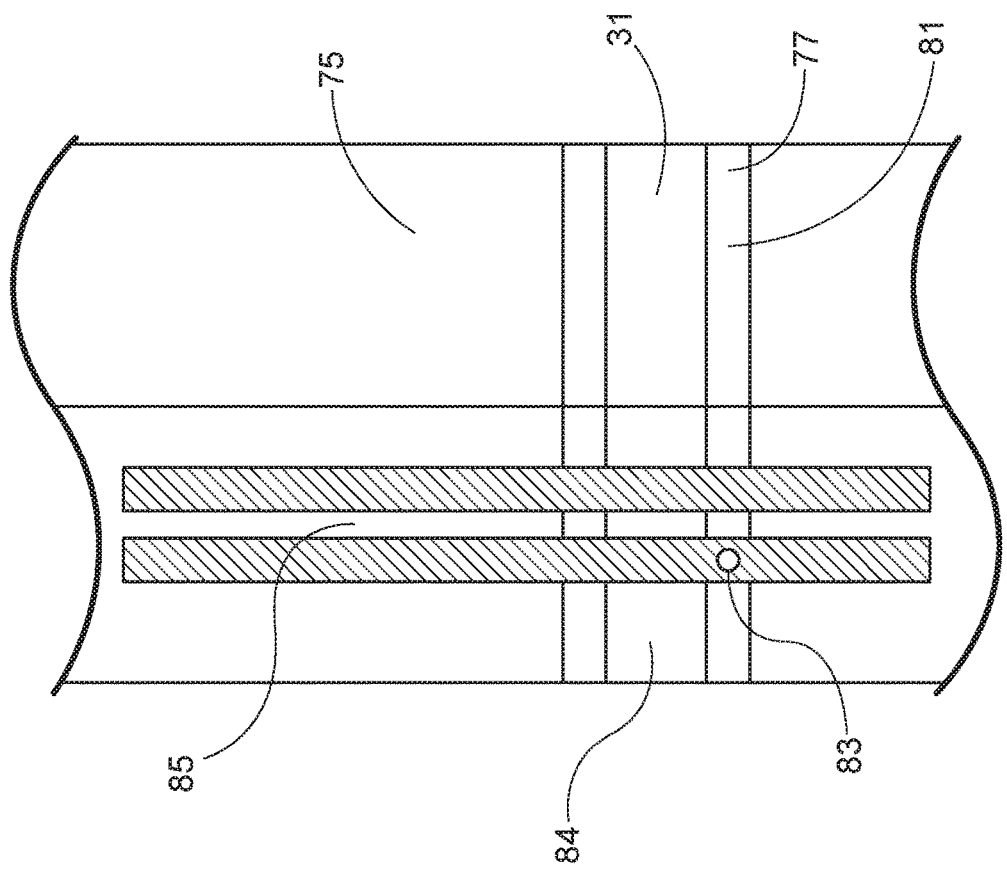
FIG. 11 depicts a top view of the roof area of FIG. 10.
Figure 12:
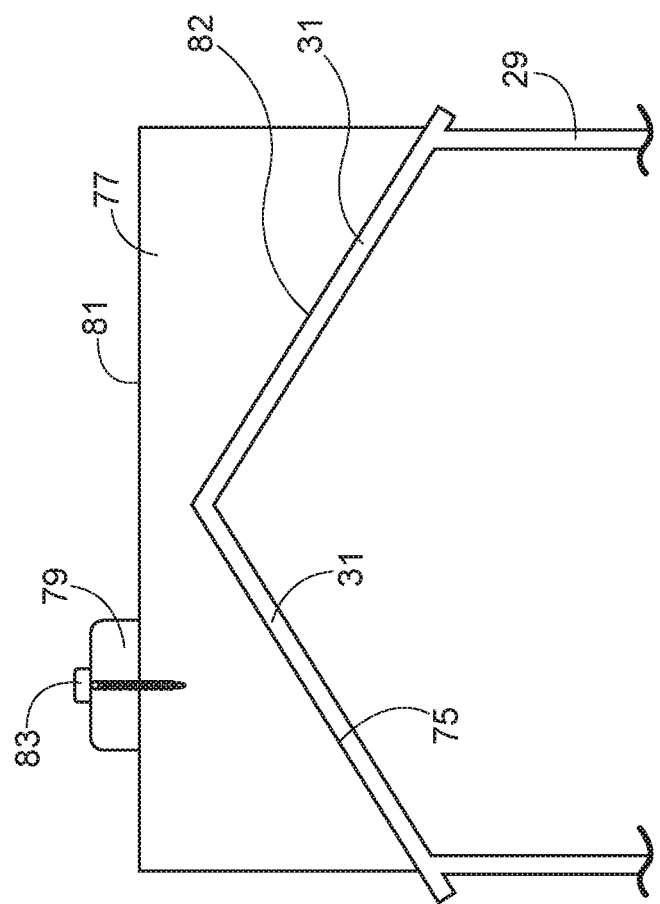
FIG. 12 depicts a cross-sectional view of the roof area of FIG. 10.

With particular reference to FIGS. 7-9, lower surface (35) of cabin assembly (3) is sized and oriented to fit against upper surface (45) of hull assembly (5) and facilitate a secure peripheral abutment between cabin assembly (3) and hull assembly (5). As shown in FIG. 7, lower surface (35) is generally horizontally oriented with respect to wall (29) of cabin assembly (3). Similarly, upper surface (45) is generally horizontally oriented with respect to wall (41) of hull assembly (5). The two horizontal elements facilitate an abutment which may be secured by any common securing mechanism known in the art, such as a fastener element (70), a weld (not shown), or a clamp element (not shown).

As shown in FIG. 8, hull assembly (5) further includes a runoff flange (71) where water from rain or waves is directed away from cabin assembly (3). As water from rain or waves moves in the direction of Arrow (D) due to gravity, runoff flange (71) directs the water over a runoff surface (73) away from cabin assembly (3) and down walls (41) of hull assembly (5). As shown in FIG. 8, runoff surface (73) may be oriented generally horizontally and parallel with upper surface (45) of hull assembly (5). Alternatively, as shown in FIG. 9, runoff flange (71A) includes an angled runoff surface (73A), extending at an angle from upper surface (45). In the embodiment of hull assembly (5) illustrated in FIG. 9, water from rain or waves travels in the direction of Arrow (D) until meeting runoff surface (73A), whereby the water is directed away from cabin assembly (3) in the direction of Arrow (E) due to gravity.

More specifically, as shown in FIG. 8, runoff flange (71) includes an inner flange (72), an outer flange (74), and a riser (76) extending therebetween. Inner flange (72) provides upper surface (45). Riser (76) includes an imaginary longitudinal riser axis (A) extending therethrough. Outer flange (74) provides runoff surface (73) and includes an imaginary longitudinal outer flange axis (B) extending therethrough. Riser axis (A) and outer flange axis (B) intersect at an angle ($\theta_1$). In some versions of houseboat assembly (1), angle ($\theta_1$) is 90 degrees. As shown in FIG. 9, outer flange (74A) includes an imaginary longitudinal outer flange axis (C), whereby riser axis (A) and outer flange axis (C) intersect at an angle ($\theta_2$). In some versions of houseboat assembly (1), angle ($\theta_2$) is generally 45 degrees. In other versions of houseboat assembly (1), riser axis (A) and outer flange axis (C) may be set at any angle generally between 1 and 90 degrees, inclusive, in order to direct rain or waves away from inner flange (72) and cabin assembly (3).

V. Roof Deck

As shown in FIGS. 7 and 10-12, roof (31) of cabin assembly (3) includes an upper surface (75). A plurality of cross-members (77) are secured to upper surface (75) to provide a horizontal surface for attaching a roof deck (80). As shown in FIG. 7, in some versions, roof deck (80) may include a plurality of deck boards (79) and railing assembly (33). Cross-members (77) are joist-like elements with a flat top surface (81) and an angled lower surface (82) configured to complementarily fit with the pitch of roof (31). Cross-members (77) are secured to roof (31) using bolts (not shown) or screws (not shown) or any other common fastening element known in the art. Cross-members (77) are spaced apart to define a set of cross-member channels (84) therebetween. Cross-member channels (84) allow water to pass between cross-members (77) and onto roof (31) to be transferred away from cabin assembly (3) via gravity interacting with the pitch of roof (31).

Similarly, deck boards (79) are spaced apart to define a set of deck board channels (85) therebetween. Deck board channels (85) allow water to pass between deck boards (79) and into cross-member channels (84) to be transferred away from cabin assembly (3). Each deck board (79) is secured to top surface (81) of cross-members (77) by a fastener (83). Fastener (83) may be a screw or bolt or any other common fastening element known in the art. Deck boards (79) may be a common off-the-shelf board formed of a wood, plastic, or a composite material. The usage of deck boards (79) eliminates the need to apply a chemical gel coat material on the uppermost surface of cabin assembly (3).

VI. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A houseboat assembly comprising a cabin assembly and a hull assembly secured to the cabin assembly, wherein the hull assembly includes a runoff flange.

Example 2

The houseboat assembly of any of the preceding or following Examples, the runoff flange comprising an inner flange having an upper surface, wherein the upper surface is configured to abut the cabin assembly; an outer flange, wherein the outer flange extends along an imaginary longitudinal outer flange axis; and a riser extending between the inner flange and the outer flange, wherein the riser extends along an imaginary longitudinal riser axis, wherein the riser axis intersects the outer flange axis at an angle.

Example 3

The houseboat assembly of any of the preceding or following Examples, wherein the angle is between one and ninety degrees.

Example 4

The houseboat assembly of any of the preceding or following Examples, wherein the angle is between thirty and sixty degrees.

Example 5

The houseboat assembly of any of the preceding or following Examples, wherein a fastening element extends through the cabin assembly and into the inner flange to secure the cabin assembly to the hull assembly.

Example 6

The houseboat assembly of any of the preceding or following Examples, wherein the cabin assembly includes a power source, an electrical component, and a marine grade wire extending therebetween, wherein the marine grade wire is configured to transmit power from the power source to the electrical component.

Example 7

The houseboat assembly of any of the preceding or following Examples, the cabin assembly comprising a roof; a plurality of cross-members secured to the roof; and a plurality of deck boards secured to the cross-members, wherein each deck board in the plurality of the deck boards are oriented generally horizontally on the cabin assembly.

Example 8

The houseboat assembly of any of the preceding or following Examples, further comprising at least one cross-member channel defined between a first cross-member in the plurality of cross-members and a second cross-member in the plurality of cross-members.

Example 9

The houseboat assembly of any of the preceding or following Examples, further comprising at least one deck board channel defined between a first deck board in the plurality of deck boards and a second deck board in the plurality of deck boards.

Example 10

The houseboat assembly of any of the preceding or following Examples, wherein each cross-member in the plurality of cross-members include a top surface and a bottom surface, wherein the bottom surface of each cross-member in the plurality of cross-members abuts the roof, and wherein each deck board in the plurality of deck boards abut the top surface.

Example 11

The houseboat assembly of any of the preceding or following Examples, further comprising a railing assembly secured to at least one deck board in the plurality of deck boards.

Example 12

The houseboat assembly of any of the preceding or following Examples, wherein at least one deck board in the plurality of deck boards is formed from a composite material.

Example 13

The houseboat assembly of any of the preceding or following Examples, wherein the cabin assembly and the hull assembly are less than nine feet in width.

Example 14

A method of constructing a houseboat assembly, the method comprising constructing a cabin assembly; constructing a hull assembly, wherein the hull assembly includes a runoff flange; and securing the cabin assembly to the hull assembly to form a houseboat assembly.

Example 15

The method of constructing a houseboat assembly of any of the preceding or following Examples, further comprising securing an upper surface of the runoff flange to a lower surface of the cabin assembly to secure the cabin assembly to the hull assembly.

Example 16

The method of constructing a houseboat assembly of any of the preceding or following Examples, further comprising forming the runoff flange with an inner flange, an outer flange, and riser extending therebetween.

Example 17

The method of constructing a houseboat assembly of any of the preceding or following Examples, wherein the wherein the outer flange includes an imaginary longitudinal outer flange axis, wherein the riser includes an imaginary longitudinal riser axis, and wherein the riser axis intersects the outer flange axis at an angle.

Example 18

The method of constructing a houseboat assembly of any of the preceding or following Examples, wherein the angle is acute.

Example 19

The method of constructing a houseboat assembly of any of the preceding or following Examples, further comprising: securing a plurality of cross-members to a roof of the cabin assembly; and securing a plurality of deck boards in a horizontal orientation to a top surface of each of the cross-members.

Example 20

A houseboat assembly comprising: a hull assembly having a runoff flange, the runoff flange comprising: an inner flange, an outer flange, wherein the outer flange extends along an imaginary longitudinal outer flange axis, a riser extending between the inner flange and the outer flange, wherein the riser extends along an imaginary longitudinal riser axis, and wherein the riser axis intersects the outer flange axis at an acute angle; and a cabin assembly, wherein the cabin assembly is secured to the inner flange.

Example 21

A method of manufacturing a houseboat assembly for a customer, the method comprising collecting a preference from a customer; and constructing a houseboat assembly in accordance with the preference, wherein the houseboat assembly includes a cabin assembly secured to a hull assembly.

Example 22

The method of any of the preceding or following Examples, wherein the preference is a desired location and further comprising securing the cabin assembly to the houseboat assembly at the desired location.

Example 23

The method of any of the preceding or following Examples, further comprising constructing the cabin assembly at a first location; and transporting the cabin assembly to the desired location.

Example 24

The method of any of the preceding or following Examples, wherein the cabin assembly is less than nine feet in width.

Example 25

The method of any of the preceding or following Examples, further comprising constructing the hull assembly at a second location; and transporting the hull assembly to the desired location.

Example 26

The method of any of the preceding or following Examples, wherein the preference is a selected floorplan selected from a plurality of floorplans and further comprising constructing the cabin assembly in accordance with the selected floorplan.

Example 27

The method of any of the preceding or following Examples, further comprising allowing the customer to customize the selected floorplan.

Example 28

The method of any of the preceding or following Examples, further comprising allowing the customer to move an element depicted in the selected floorplan to customize the selected floorplan.

Example 29

The method of any of the preceding or following Examples, further comprising constructing the houseboat assembly on a trailer.

Example 30

The method of any of the preceding or following Examples, further comprising providing a graphical user interface to a customer through a web browser; and collecting the preference through the graphical user interface.

Example 31

A method of forming a houseboat assembly, the method comprising selecting a selected boat style from a plurality of boat styles; selecting a selected floorplan from a plurality of floorplans; constructing an exterior profile of a houseboat assembly in accordance with the selected boat style; and constructing an interior profile of the houseboat assembly in accordance with the selected floor plan.

Example 32

The method of any of the preceding or following Examples, further comprising providing a graphical user interface to a customer; and allowing the customer to select the selected boat style via the graphical user interface.

Example 33

The method of any of the preceding or following Examples, further comprising providing a graphical user interface to a customer; and allowing the customer to select the selected floorplan via the graphical user interface.

Example 34

The method of any of the preceding or following Examples, further comprising customizing, by the user, an element of the floorplan.

Example 35

The method of any of the preceding or following Examples, wherein the customizing includes one of adding, moving, or removing, wherein the element includes one of a wall, stairway, or window.

Example 36

The method of any of the preceding or following Examples, the method comprising selecting a selected floorplan from a plurality of floorplans; constructing a cabin assembly in accordance with the selected floor plan; and securing the cabin assembly to a hull assembly to form a houseboat assembly.

Example 37

The method of any of the preceding or following Examples, further comprising constructing the cabin assembly at a first location; constructing the hull assembly at one of the first location or a second location; and securing the cabin assembly to the hull assembly at a third location.

Example 38

The method of any of the preceding or following Examples, further comprising providing a graphical user interface to a customer; and selecting, by the customer, the third location.

Example 39

The method of any of the preceding or following Examples, wherein the constructed cabin assembly is less than nine feet wide, wherein the constructed hull assembly is less than nine feet wide.

Example 40

The method of any of the preceding or following Examples, further comprising securing the cabin assembly to the hull assembly to form the houseboat assembly while the hull assembly is disposed in a hull receiving section of a trailer.

VII. Miscellaneous

It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

I claim:

1. A houseboat assembly comprising:
   (a) a cabin assembly comprising:
      (i) a set of cabin walls, wherein the cabin walls include a selected layout configuration, wherein the selected layout configuration is one of a plurality of layout configurations selected by a user,
      (ii) a roof, wherein the roof is positioned above the cabin walls, wherein the roof of the cabin assembly includes one or more angled portions oriented at an obtuse angle relative to a longitudinal axis defined by one or more cabin walls of the set of cabin walls,
      (iii) a plurality of cross-members, wherein each cross-member of the plurality of cross-members is configured to receive each angled portion of the one or more angled portions, and
      (iv) a plurality of deck boards, wherein each deck board is secured to an upper surface of each cross-member, wherein each deck board is oriented at a ninety degree angle relative to the longitudinal axis defined by the one or more cabin walls; and
   (b) a hull assembly having a predetermined configuration including a set of hull walls cooperating to define an interior pocket, the predetermined configuration being configured to permit assembly of the hull assembly at a separate location relative to the cabin assembly,
   wherein the cabin assembly is secured to the hull assembly by one or more fasteners connecting a lower surface of the cabin assembly to an upper surface of the hull assembly.

2. The houseboat assembly of claim 1, wherein the cabin assembly is less than nine feet in width.

3. The houseboat assembly of claim 1, wherein the hull assembly includes a runoff flange.

4. The houseboat assembly of claim 3, wherein the runoff flange includes an inner flange, an outer flange, and a riser extending therebetween, wherein the inner flange defines the upper surface of the hull assembly.

5. The houseboat assembly of claim 4, wherein the riser and the outer flange define an angle therebetween, wherein the angle is ninety degrees.

6. The houseboat assembly of claim 4, wherein the riser and the outer flange define an angle therebetween, wherein the angle is greater than ninety degrees.

7. The houseboat assembly of claim 3, wherein the runoff flange includes an inner flange, an outer flange, and a riser, wherein the outer flange extends along a longitudinal outer flange axis, wherein the riser extends between the inner flange and the outer flange, wherein the riser extends along a longitudinal riser axis, and wherein the riser axis intersects the outer flange axis at an acute angle.

8. A houseboat assembly comprising:
(a) a cabin assembly, wherein the cabin assembly includes a plurality of cabin walls, a roof positioned above the cabin walls, and a lower surface positioned beneath the cabin walls, wherein the roof includes a pitched portion, a plurality of cross-members, and a roof deck, wherein the pitched portion is oriented at an obtuse angle relative to a vertical axis defined by at least one cabin wall of the plurality of cabin walls, wherein each cross-member includes an angled lower surface and a flat upper surface, wherein the angled lower surface is configured to correspond to the orientation of the pitched portion, wherein the roof deck is fastened to the flat upper surface of each cross-member; and
(b) a hull assembly including a set of hull walls and an upper surface,
wherein the cabin assembly is secured to the hull assembly by a plurality of fasteners connecting the lower surface of the cabin assembly to the upper surface of the hull assembly.

9. The houseboat assembly of claim 8, wherein the roof deck includes a plurality of deck boards.

10. The houseboat assembly of claim 8, wherein the roof deck is configured to permit liquid to flow therethrough to the pitched portion of the roof.

11. The houseboat assembly of claim 8, wherein the hull assembly further includes a runoff flange, wherein the pitched portion is configured to direct water down one or more cabin walls of the plurality of cabin walls and toward the runoff flange.

* * * * *